US008517094B2

(12) United States Patent
Sweatman et al.

(10) Patent No.: US 8,517,094 B2
(45) Date of Patent: Aug. 27, 2013

(54) DETECTING AND CORRECTING UNINTENDED FLUID FLOW BETWEEN SUBTERRANEAN ZONES

(75) Inventors: Ronald E. Sweatman, Montgomery, TX (US); Glenn R. McColpin, Katy, TX (US); Eric J. Davis, El Cerrito, CA (US); Scott D. Marsic, Oakland, CA (US)

(73) Assignee: Landmark Graphics Corporation, Houston, TX (US)

( * ) Notice: Subject to any disclaimer, the term of this patent is extended or adjusted under 35 U.S.C. 154(b) by 345 days.

(21) Appl. No.: 12/875,235

(22) Filed: Sep. 3, 2010

(65) Prior Publication Data

US 2012/0055674 A1 Mar. 8, 2012

(51) Int. Cl.
*E21B 47/10* (2012.01)

(52) U.S. Cl.
USPC .................................................. 166/250.08

(58) Field of Classification Search
USPC ................ 166/337, 250.08, 90.1, 305.1, 281
See application file for complete search history.

(56) References Cited

U.S. PATENT DOCUMENTS

| | | | | |
|---|---|---|---|---|
| 3,003,557 A | * | 10/1961 | Huitt et al. | 166/271 |
| 3,199,588 A | * | 8/1965 | Holbert | 166/295 |
| 3,612,608 A | * | 10/1971 | Manker et al. | 299/4 |
| 4,809,780 A | | 3/1989 | Shen | |
| 5,520,247 A | | 5/1996 | Gmelig Meyling et al. | |
| 5,721,538 A | | 2/1998 | Tubel et al. | |
| 5,836,390 A | | 11/1998 | Apps et al. | |
| 5,913,364 A | | 6/1999 | Sweatman | |
| 5,961,438 A | | 10/1999 | Ballantine et al. | |
| 6,060,434 A | | 5/2000 | Sweatman | |
| 6,167,967 B1 | | 1/2001 | Sweatman | |
| 6,258,757 B1 | | 7/2001 | Sweatman | |
| 6,926,081 B2 | | 8/2005 | Sweatman | |
| 7,311,147 B2 | | 12/2007 | Sweatman | |
| 7,314,082 B2 | | 1/2008 | Sweatman et al. | |
| 7,768,441 B2 | * | 8/2010 | Davis et al. | 342/25 R |
| 2001/0045280 A1 | * | 11/2001 | Longbottom et al. | 166/271 |

(Continued)

FOREIGN PATENT DOCUMENTS

WO 2004-096940 A1 11/2004
WO 2010-057931 A1 5/2010

OTHER PUBLICATIONS

Koplos, J. et al. "A Review of Injection Well Mechanical Integrity Testing Data and Implications for Geosequestration." IEA Greenhouse Gas R&D Programme, 3rd Well Bore Integrity Network Meeting, Santa Fe, New Mexico; Mar. 12-13, 2007.

(Continued)

*Primary Examiner* — Jennifer H Gay
*Assistant Examiner* — Kipp Wallace
(74) *Attorney, Agent, or Firm* — Mark E. Scott; Conley Rose, P.C.

(57) ABSTRACT

Detecting and correcting unintended fluid flow between subterranean zones. At least some of the illustrative embodiments are methods that include: injecting a first fluid into a subterranean zone, the injecting by way of a first borehole; making a reading indicative of surface deformation; identifying, based on the surface deformation reading, a flow path for a second fluid out of the subterranean zone; drilling a second borehole that intersects the flow path; and placing a sealing compound into the flow path by way of the second borehole, the sealing compound reduces the flow of the second fluid through the flow path.

22 Claims, 8 Drawing Sheets

(56) References Cited

U.S. PATENT DOCUMENTS

| | | | |
|---|---|---|---|
| 2003/0205375 A1* | 11/2003 | Wright et al. | 166/250.1 |
| 2004/0163822 A1 | 8/2004 | Zhang et al. | |
| 2004/0206495 A1 | 10/2004 | Lehman et al. | |
| 2005/0115711 A1 | 6/2005 | Williams et al. | |
| 2005/0197777 A1 | 9/2005 | Rodney et al. | |
| 2005/0197781 A1 | 9/2005 | Harmon et al. | |
| 2006/0081412 A1* | 4/2006 | Wright et al. | 181/104 |
| 2006/0219402 A1 | 10/2006 | Lecampion et al. | |
| 2007/0235181 A1 | 10/2007 | Lecampion et al. | |
| 2009/0052277 A1 | 2/2009 | Swanson | |
| 2009/0065198 A1 | 3/2009 | Suarez-Rivera et al. | |
| 2009/0125280 A1 | 5/2009 | Soliman et al. | |
| 2009/0255670 A1 | 10/2009 | Koyama et al. | |
| 2009/0313772 A1 | 12/2009 | Talley | |
| 2010/0155139 A1* | 6/2010 | Kuckes | 175/45 |
| 2011/0066380 A1* | 3/2011 | Hager et al. | 702/8 |
| 2012/0113752 A1 | 5/2012 | De Paulis et al. | |

OTHER PUBLICATIONS

Sweatman, R. et al. "New Approach and Technology for CO2 Flow Monitoring and Remediation." SPE 137834, presented at Abu Dhabi International Petroleum Exhibition & Conference held in Abu Dhabi, United Arab Emirates; Nov. 1-4, 2010.

Sweatman, R. et al. "Advancements in Technology and Process Approach Reduce Cost and Increase Performance of CO2 Flow Monitoring and Remediation." SPE 138258, presented at the International Conference on CO2 Capture, Storage, and Utilization held in New Orleans, Louisiana; Nov. 10-12, 2010.

Sweatman, R. et al. "Industry Experience With CO2-Enhanced Oil Recovery Technology." SPE 126446, presented at the 2009 SPE International Conference on CO2 Capture, Storage, and Utilization held in San Diego, California; Nov. 2-4, 2009.

Sweatman, R. et al. "Outlook and Technologies for Offshore CO2 EOR/CCS Projects." OTC-21984-PP, presented at the Offshore Technology Conference held in Houston, Texas; May 2-5, 2011.

Contek Solutions et al. "Summary of Carbon Dioxide Enhanced Oil Recovery (CO2EOR) Injection Well Technology." American Petroleum Institute, Aug. 2007.

Unpublished U.S. Appl. No. 12/956,609, entitled "Evaluating Surface Data," filed Nov. 30, 2010.

International Search Report and Written Opinion issued Jan. 10, 2012 in International Patent Application No. PCT/US2011/036652.

Clanton, R., •Real-Time Monitoring of Acid Stimulation Using a Fiber-Optic DTS System• SPE 100617 presented at Westerion Regional / AAPG Pacific Section / GSA Cordilleran Section Joint Meeting, May 8-10, 2006, Anchorage, Alaska, USA.

Davis, E., •Use of deformation based reservoir monitoring for early warning leak detection,• to be presented at the 2010 International Conference on Greenhouse Gas Technologies (GHGT10) held in RAI Amsterdam, The Netherlands, Sep. 19 • 23.

Davis, E., "Precise Tiltmeter Subsidence Monitoring Enhances Reservoir Management", SPE paper 62577 presented at 2000 SPE/AAPG Western Regional Meeting held in Long Beach, California, Jun. 19-23.

Davis, E., Precise Deformation Monitoring by High Resolution Tiltmeters, SEGJ presented at the 2001 Conference and published in the Butsuri-Tansa vol. 54, No. 6 pp. 425-432.

Davis, E., Combining InSAR and GPS for Improved Surface Deformation Monitoring, WHOC 2008-306 presented at the World Heavy Oil Congress, Edmonton, Alberta Mar. 10-12, 2008.

Davis, E.J., •Deformation Monitoring Through Multi-Platform Integration,• 2008 13gh FIG Symposium on Defomration Measurement and Analysis / 4th IAG Symposium on Geodesy for Geotechnical and Structural Engineering, LNEC,Lisbon, May 12-15, 2008.

Jones, D.L., •Improved Magnetic Model for Determination of Range and Direction to a Blowout Well,• paper SPE 14388 presented at the 1985 SPE Annual Technical Conference and Exhibition held in Las Vegas, Sep. 22-25.

Du, J., "Model Uncertainties and Resolution Studies With Application to Subsurface Movement of a CO2 Injection Project in the Krechba Field Using InSAR Data", Journal of Canadian Petroleum Technology, V. 49, No. 6, pp. 31-37, Jun. 2010.

Du, J., "Mapping Reservoir Volume Changes During Cyclic Steam Stimulation Using Tiltmeter-Based Surface-Deformation Measurements", SPE 97848, Jun. 27, 2007.

Rosen, P.A., "Synthetic Aperture Radar Interferometry", Proceedings of the IEEE, vol. 88, No. 3, Mar. 2000.

Sanad, M., Butler, •Numerical Models Help Analyze Lost-Circulation/Flow Events and Frac Gradient Increase to Control an HPHT Well in the East Mediterranean Sea,• paper SPE 87094 presented at the 2004 IADC/SPE Drilling Conference held in Dallas, Texas, U.S.A., Mar. 2•4, 2004.

Seifert, D.J., •Deep Electrical Images, Geosignal and Real Time Inversion Help Guide Steering Decisions,• paper SPE 123940 presented at the 2009 SPE Annual Technical Conference and Exhibition held in New Orleans, Louisiana, USA, Oct. 4•7.

Sweatman, R., •New Solutions to Remedy Lost Circulation, Crossflows, and Underground Blowouts,• paper SPE 37671 presented at the 1997 SPE/IADC Drilling Conference held in Amsterdam, The Netherlands, Mar. 4-6.

Sweatman, R., •Conformance-While-Drilling Technology Proposed to Optimize Drilling and Production,• paper SPE 53312 presented at the 1999 SPE 11th Middle East Oil Show and Conference held in Bahrain, Feb. 20•23.

Sweatman, R., "Monitoring technology enables long-term CO2 geosequesration", E&P. Magazine, Nov. 2009 issue.

Tarr, B.A., •Use of New Ranging Tool to Position a Vertical Well Adjacent to a Horizontal Well,• paper SPE 20446 presented at the 1990 SPE Annual Technical Conference and Exhibition held in New Orleans, Sep. 23-26.

Wagner, M.J., Mission Spotlight: Raising the Radar Bar• Inside the RADARSAT-2 Program.• http://www.eijournal.com/RADARSAT-2.asp. Dec. 17, 2007.

Wapinski, N.R., "Improved Microseismic Fracture Mapping Using Perforation Timing Measurements for Velocity Calibration," SPE 84488, Mar. 2005.

Wright, C.A., "Downhole Tiltmeter Fracuture Mapping: Finally Measuring Hydraulic Fracture Dimentions", SPE 46194, 2008 SPE Western Regional Meeting, Bakersfield, CA, May 10-13.

Wright, C.A, "Reorientation of Propped Refracture Treatments in the Lost Hills Field", SPE 27896, Pinnacle Technologies, Long Beach, CA 22-5 Mar. 1984.

Wright, C.A., "Surface Tiltmeter Fracture Mapping Reaches New Depths—10,000 Feet and Beyond?", SPE 39919, 1998 SPE Rocky Mountain Regional / Low-Permeability Reservoirs Symposium, Apr. 5-8, Denver, Colorado.

Speiss, F.N., Precise GPS/Acoustic Positioning of Seafloor Reference Points for Tectonic Studies, Marine Physical Laboratory, Scripps Institution of Oceanography, UCSD, San Diego, CA USA.

McColpin, G.R., "Surface Deformation Monitoring as a Cost Effective MMV Method" GHGT-9, Energy Procedia, Pinnacle Technologies, Houston, TX USA.

Koperna, G.J. "Co2-ECBM/Storage Activities at the San Juan Basin's Pump Canyon Test Site" SPE 124002, Advanced Resources International, New Orleans, LA Oct. 4-7, 2009.

Oudinot, A.Y. "Co2 Injection Performance in the Fruitland Coal Fairway, San Juan Basin; Results of a Field Pilot", SPE 127073, Advanced Resources International, San Diego, CA Nov. 3-4, 2009.

Office Action issued Dec. 21, 2012 in U.S. Appl. No. 13/300,247.

International Search Report and Written Opinion issued Feb. 28, 2013 in International Patent Application No. PCT/US2012/064609.

Office Action issued May 16, 2013 in U.S. Appl. No. 13/300,247, filed Nov. 18, 2011.

\* cited by examiner

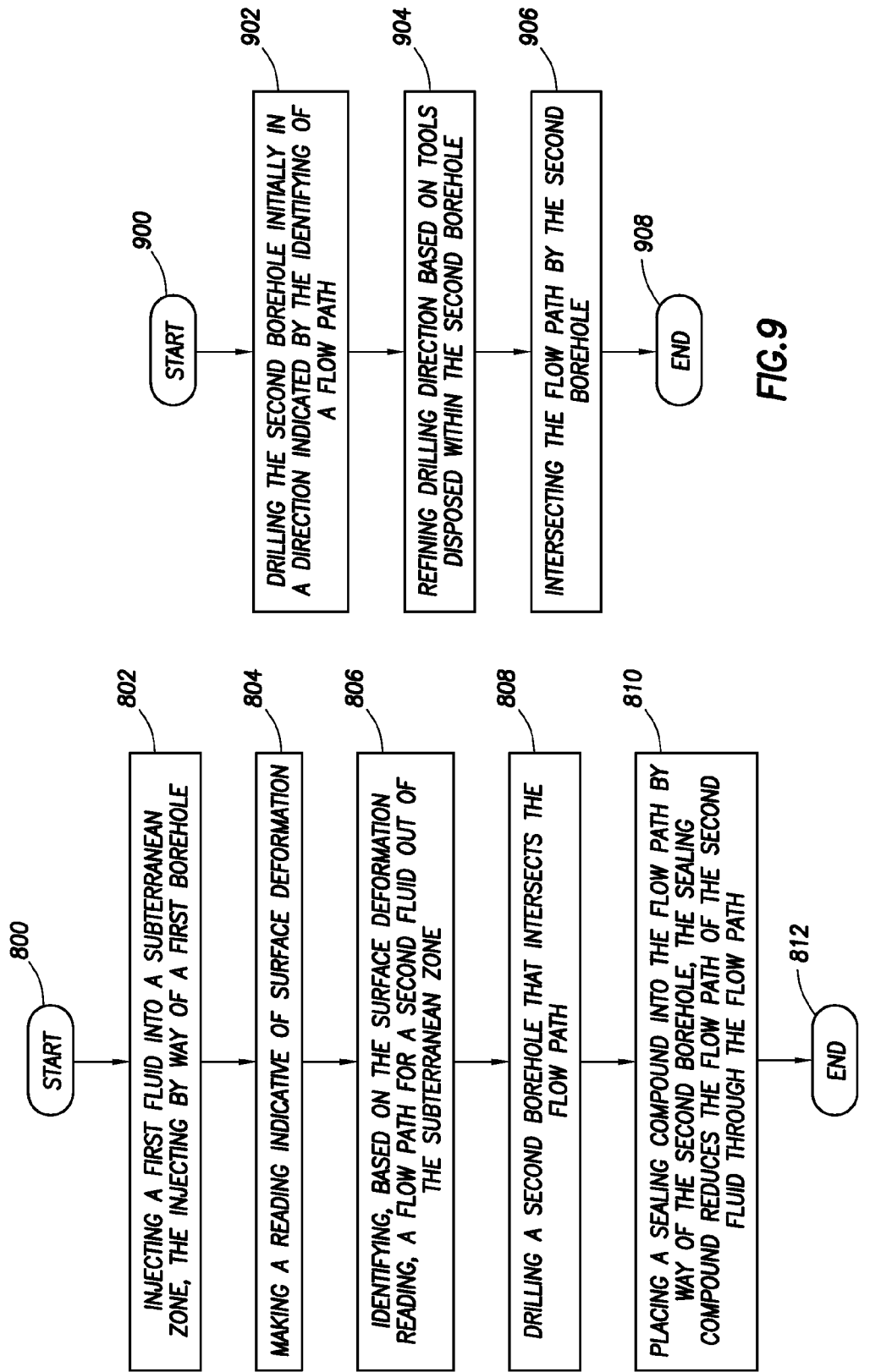

DETECTING AND CORRECTING UNINTENDED FLUID FLOW BETWEEN SUBTERRANEAN ZONES

BACKGROUND

In the production of hydrocarbons, particularly natural gas, a significant amount of carbon dioxide is also produced from underground formations. The carbon dioxide is separated from the hydrocarbons as part of the refining process. Some of the carbon dioxide is used for other purposes, such as formation fracturing operations and enhanced oil recovery, but the remaining carbon dioxide is disposed of in some fashion. One technique is to inject the carbon dioxide back into an underground formation for permanent storage, known as sequestering. These and other sources of carbon dioxide are also being stored underground to reduce greenhouse gas emissions.

Sequestering carbon dioxide carries a risk that the sequestered carbon dioxide will escape out of the underground formation into other formations, like formations containing drinking water, or escape to the surface. As of the writing of this specification, the inventors are not aware of any sustained instance where sequestered carbon dioxide has escaped to the surface or contaminated a drinking water formation; however, temporary leaks have occurred and any method that could be employed to detect a leak, and stop any such leak, would be beneficial.

BRIEF DESCRIPTION OF THE DRAWINGS

For a detailed description of exemplary embodiments, reference will now be made to the accompanying drawings in which:

FIG. 8 shows a method in accordance with at least some embodiments; and

FIG. 9 shows a method in accordance with at least some embodiments.

NOTATION AND NOMENCLATURE

Certain terms are used throughout the following description and claims to refer to particular system components. As one skilled in the art will appreciate, oilfield service companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Sequestering" shall mean placing in a particular location for storage purposes, but shall not imply a time frame for the storage, nor shall sequestering be obviated by leaks from the particular location.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Furthermore, the various embodiments were developed in the context of sequestering carbon dioxide in subterranean zones, and thus the description that follows is based on the developmental context. However, the methods and systems described may be used regardless of the type of fluid injected into a subterranean zone, and regardless of the reason for the injection. For example, the various methods and systems find use in sequestering of other fluids, and find use in injecting for other reasons (e.g., secondary recovery operations), and thus the developmental context shall not be read as a limitation as to the scope of the claims. Moreover, the application is related to two Society of Petroleum Engineers (SPE) Paper No. 137843 by Ronald Sweatman et al. titled "New Approach and Technology for $CO_2$ Flow Monitoring and Remediation", as well as SPE Paper No. 138258 by Ronald Sweatman et al. also titled "New Approach and Technology for $CO_2$ Flow Monitoring and Remediation."

Figure 1:
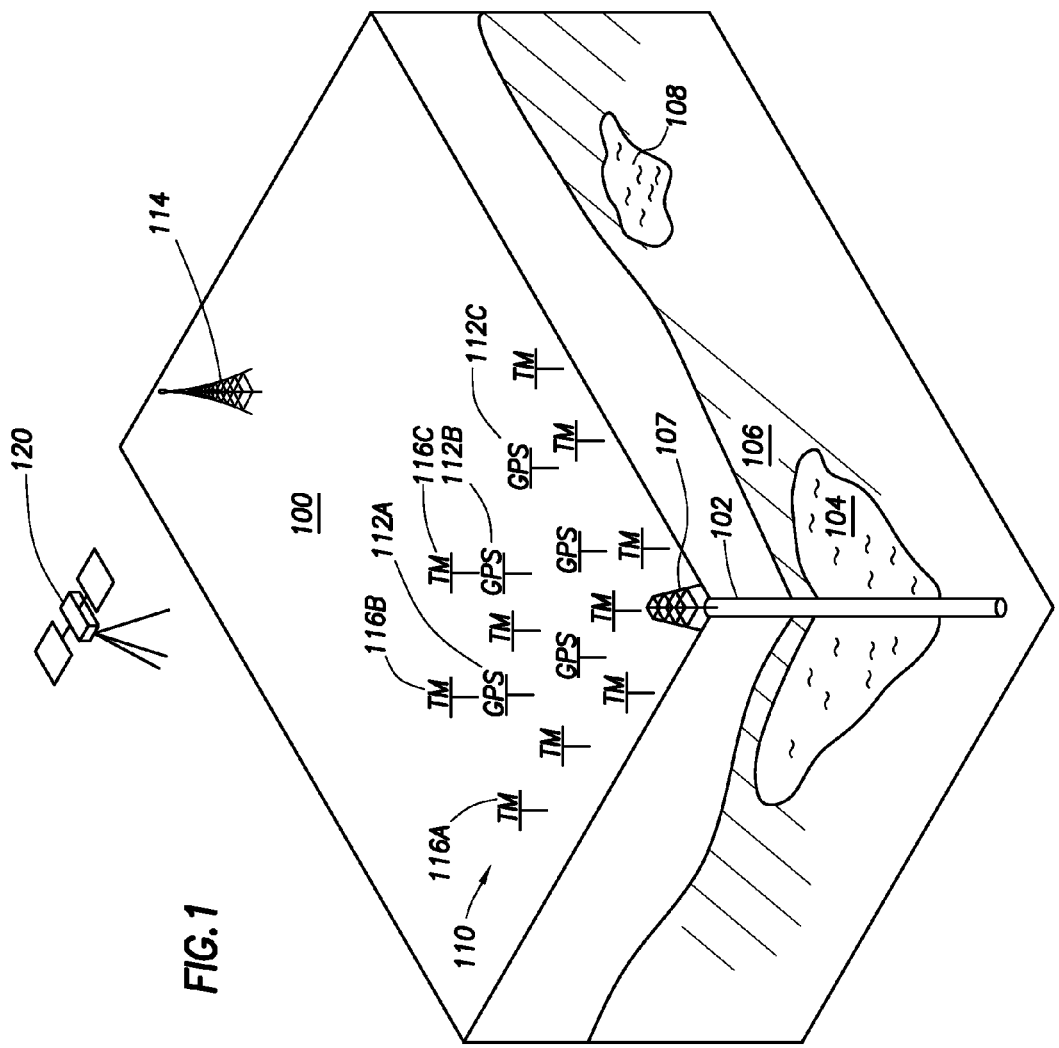
FIG. 1 shows a perspective cut-away view of a plurality of subterranean zones and related monitoring equipment, in accordance with at least some embodiments.

FIG. 1 shows a perspective cut-away view of a hydrocarbon producing field in order to explain concepts used in the various embodiments. In particular, FIG. 1 shows a section of earth 100 into which a borehole 102 has been drilled. In accordance with at least some embodiments, the borehole 102 is at least partially cased, and a portion of the casing that abuts subterranean zone 104 is perforated to allow fluid communication between the borehole and subterranean zone 104. Although FIG. 1 shows a derrick 107 associated with the borehole 102, in many cases the derrick 107 will have been removed and only a valve stack and related piping will denote the wellhead at the surface.

In some embodiments, the subterranean zone 104 is a zone of porous rock that contains or contained hydrocarbons. Several factors work together to create a subterranean zone, including not only the porous rock, but also a substantially impermeable rock layer 106 capping the zone 104, thus trapping the hydrocarbons within the subterranean zone 104. For that reason, in some cases the rock layer 106 is referred to as a "cap rock" layer. Illustrative FIG. 1 also shows a second subterranean zone 108 which may be capped by the same or a different cap rock layer. The importance of the second subterranean zone 108 will be discussed in relation to unintended flow paths out of illustrative subterranean zone 104, which may also be referred to as leaks, the discussion in greater detail below.

When fluids such as hydrocarbons are removed from a subterranean zone, slight surface deformation may take place, and in particular subsidence. Conversely, when fluids are injected into a subterranean zone, slight surface deformation may take place, and in particular surface swelling or rising. In some cases, the deformation may concentrate in or around a well from said injected fluid's leak flow path. More particularly, surface deformation responsive to injecting of fluids into illustrative subterranean zone 104 is in most cases linearly proportional to the volume of fluid injected, and inversely proportional the square of the depth. Different types of rock formations may have greater or lesser response to injected fluids. Given the depth of most subterranean zones in which carbon dioxide may be sequestered, even for high volumes of injected carbon dioxide the amount of surface deformation may be on the centimeter scale, and in many cases on the millimeter scale.

In accordance with the various embodiments, at or near the surface 110 resides a plurality of illustrative devices used to detect surface deformation. For example, the illustrative system of FIG. 1 shows a plurality of deformation measurement devices 112 (three such devices labeled 112A, 112B and 112C, but additional devices shown but not numbered) in the form of Global Positioning System (GPS) based measurements. The GPS-based measurement devices 112 make elevation measurements based on signals from a constellation of satellites that orbit the earth. In many cases, calculating elevation based on signals from GPS satellites alone will not result in elevation calculations to the centimeter or millimeter scale. Thus, in accordance with at least some embodiments the illustrative deformation measurement devices 112 also use signals from a surface-based station 114, which enables each GPS-based deformation measurement device to make elevation readings to the centimeter and/or millimeter scale, and in some cases with accuracies of two millimeters or less.

Still referring to FIG. 1, the illustrative system of FIG. 1 also shows a plurality of deformation measurement devices 116 (three such devices labeled 116A, 116B and 116C, but additional devices shown but not numbered) in the form of inclinometer-based measurements (labeled TM for "tilt meter") placed proximate to the surface. The inclinometer-based measurements may be made at the surface in some cases, and in yet other case the measurement devices 116 may be placed within 20 to 40 feet of the surface (yet still be considered proximate to the surface). The inclinometer-based devices 116 do not measure absolute elevation, but instead, when multiple measurements are made over time, provide an indication of changes in tilt or incline of the sensor. If the sensor is permanently or semi-permanently coupled at or near the surface of the earth, then indications of tilt or incline of the earth's surface may be made. Inclinometer-based devices have resolutions that can detect changes in inclination when surface deformations are on the millimeter scale, and in particular in some cases the inclinometer-based measurements are made with resolutions to 0.00000005 degrees.

Inclinometer-based readings provide high precision and accuracy over short periods of time extending to several months, but with current technology and deployment cannot provide high accuracy elevation changes over significantly longer periods. Thus in some embodiments the GPS-based deformation measurement devices are combined with inclinometer-based measurement devices such that high accuracy is maintained over periods of time exceeding several months.

FIG. 1 further illustrates a satellite 120. In accordance with yet further embodiments, satellite 120 is used to take interferometric synthetic aperture radar (InSAR) measurements of surface deformation over the subterranean zone 104. While FIG. 1 illustrates the InSAR measurements by way of a satellite, in other embodiments InSAR may be taken from airplane-based platforms, tower-mounted stations or stations that take advantage of natural terrain features to provide a direct view of the ground surface under study. InSAR measurements perform centimeter scale or better measurements of change in elevation. In some cases, such as the RADARSAT-2 SAR platform, InSAR has a three meter pixel size, and a single set of synthetic aperture readings may cover an area of 100 kilometers by 100 kilometers. Larger images may be made by splicing together multiple sets of readings. The power of InSAR is determining a change in surface deformation, where a first InSAR measurement is taken, and some time later (in accordance with the various embodiments hours or days), a second InSAR measurement is taken. Though InSAR cannot determine actual elevation, changes in elevation between measurements can be very accurately determined, including changes in elevation on the millimeter scale. In some embodiments, permanent or semi-permanent reflectors may be placed to help ensure good InSAR readings (such as when surface vegetation covers the area or changes, or where the area is subject to snow accumulations).

GPS-based measurements, inclinometer-based measurements, and InSAR-based measurements are used in the related-art, but for a different purpose than in the various embodiments. In particular, for some hydrocarbon producing underground formations, a secondary recovery technique is used whereby steam is injected into the formation through one borehole in an attempt to increase hydrocarbon production (usually oil) from a second borehole in relatively close proximity. However, because of the nature of the formation in which steam injection as a secondary recovery technique is used, the steam occasionally finds its way to the surface. In the related-art one or a combination of the GPS-based measurements, inclinometer-based measurements, and InSAR-based measurements are used to predict locations where secondary recovery steam is about to break the surface, and to determine from which borehole the steam was injected. As mentioned above, the amount of surface deformation is inversely proportional to the square of the depth, and thus the amount of localized deformation for steam close enough to break the surface is relatively high compared to surface deformation associated with a deep subterranean zone. Moreover, the techniques related to surface deformation are used to trace the steam back to the steam injection borehole, such that the steam injection can be stopped and/or the borehole permanently shut in. An illustrative service provider for providing GPS-based measurements, inclinometer-based measurements and/or InSAR-based measures is the PINNACLE™ brand service provided by Halliburton Energy Services, Inc, of Houston, Tex.

It is noted that one of ordinary skill in the art is aware of the GPS-based measurements, inclinometer-based measurements, and InSAR-based measurements (in the context noted in the immediately preceding paragraph), and thus so as not to unduly complicate this description and to avoid obscuring the various embodiments, a more detailed discussion of each measurement technology is omitted.

Figure 2:
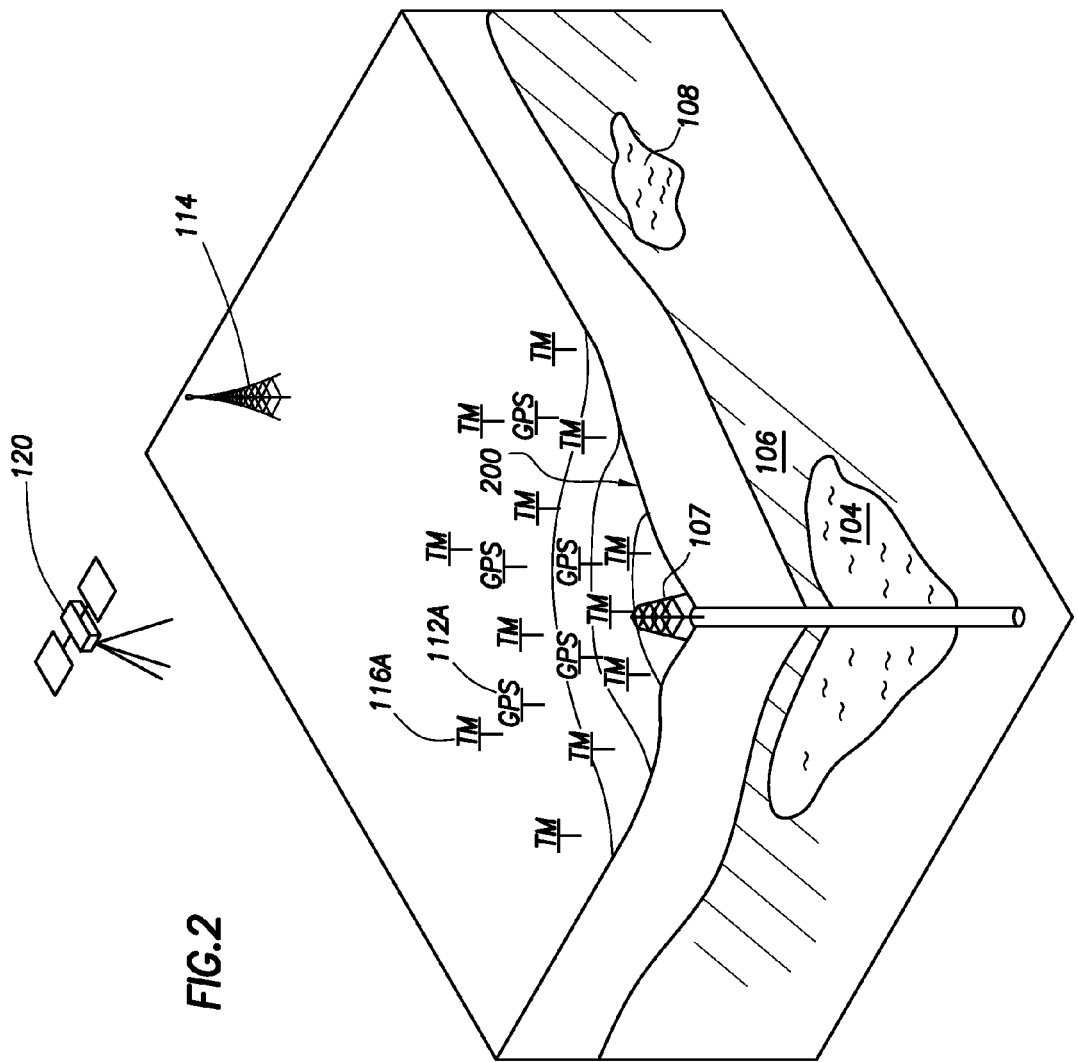
FIG. 2 shows a perspective cut-away view of a plurality of subterranean zones and related monitoring equipment after injection of a fluid in one of the subterranean zones, in accordance with at least some embodiments.

Now consider the situation where illustrative carbon dioxide is pumped or injected into the subterranean zone 104. In most situations, the carbon dioxide is under sufficient pressure to be a liquid, but having the carbon dioxide in the form of a liquid is not required. The additional volume in the subterranean zone 104 creates a surface deformation 200 as illustrated in FIG. 2. The deformation 200 illustrated in FIG. 2 is greatly exaggerated for purposes of clarity. Again, in most case the amount of surface deformation will be a centimeter or less, and in many cases the surface deformation will be merely a few millimeters. Nevertheless, in accordance with the various embodiments a surface deformation reading is made during and/or after the carbon dioxide is injected, the surface deformation reading by one or more of GPS-based measurements, inclinometer-based measurements, InSAR-based measurements, and/or any other technology that directly or indirectly measures surface deformation. In the illustrative case of FIG. 2, the sequestered carbon dioxide is fully contained within the subterranean zone 104.

However, for a variety of reasons, the sequestered carbon dioxide may escape or leak from the subterranean zone 104. The leak creates a flow path for fluids out of the subterranean zone 104. The fluid that leaks from a subterranean zone may be different in each situation. If the leak path is on the fringes of the subterranean zone relatively far from the injection point of the carbon dioxide, the leaking fluid may be a constituent fluid of the subterranean zone, such as hydrocarbon or water. On the other hand, if the leak is near the injection point, or substantially all the hydrocarbons have been removed from the subterranean zone, then the leaking fluid may be the sequestered carbon dioxide. Yet further still, depending on how long the leak occurs, the leaking fluid may change from a constituent fluid of the subterranean zone to carbon dioxide.

Figure 3:
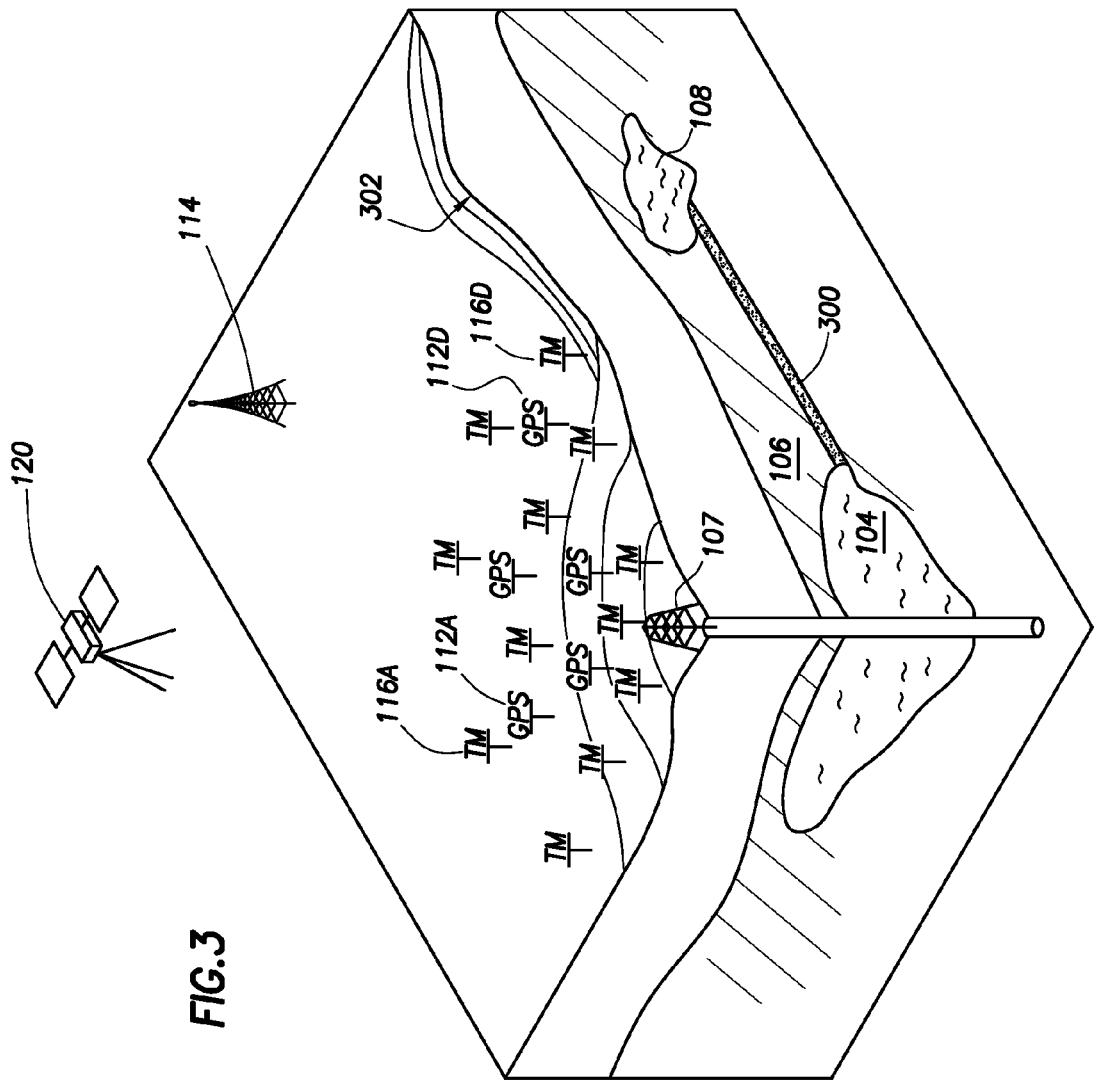
FIG. 3 shows a perspective cut-away view of a plurality of subterranean zones and related monitoring equipment after a leak has formed between the subterranean zones, in accordance with at least some embodiments.

In accordance with the various embodiments, the surface deformation readings are used to determine whether there is a leak of the sequestered fluid out of the subterranean zone 104. With respect to determining whether sequestered fluid is or has escaped, consider FIG. 3. In particular, FIG. 3 illustrates a situation where a flow path 300 develops between the illustrative subterranean zone 104 and illustrative subterranean zone 108. There may be a variety of reasons for a leak between subterranean zones. For example, the sub-surface deformation caused by the increased volume of fluids by sequestering in a subterranean zone may cause flow pathways to open in poorly sealed wells or between layers of rock that were previously sealed by the great weight above the layers. Moreover, such subsurface deformation may cause cracking and fissures to form, which then may open flow paths between the subterranean zones. Yet further still, natural geological faults may be pre-existing between the subterranean zones, and increased pressures within the first subterranean zone may force fluids along the pre-existing geological fault.

Making a determination that the subterranean zone is developing or has developed a leak may take many forms depending on the particular situation. For example, after a sufficient amount of fluid has leaked from the subterranean zone 104, the surface deformation readings over the subterranean zone 104 may show subsidence. Such subsidence after swelling that corresponds with injection of the sequestered fluid may be indicative of a leak. Likewise, in some cases the fluid wave front moving through flow path 300 may itself cause surface deformation that is detectable, such as by illustrative GPS-based measurement station 112D, inclinometer-based measurement station 116D, or InSAR-based measurements scanning areas beyond the surface above the subterranean zone 104. Yet further still, the fluid moving into subterranean zone 108 may cause surface deformation 302, which may be detected by ground-based measurement devices (if present), or InSAR-based measurements scanning areas beyond the surface above the subterranean zone 104.

The frequency of measurement of surface deformation may differ for each circumstance. For example, in cases where a leak is unlikely, InSAR-based measurements may be taken only every three months or so; however, once InSAR, or any other measurement system, gives an indication that a leak has developed or may be developing, the frequency of some of all the measurements may increase. In some cases, when checking for a leak from a subterranean zone, InSAR-based measurements may be taken every two to four weeks, with inclinometer-based measurements and GPS-based measurements every hour. Greater or lesser time intervals for measurements may be equivalently used, but such intervals are still more frequent then surface-based observations used for other systems (such as to monitor secondary recovery injection fluids). A risk assessment is used to determine the initial time intervals where a high risk situation requires a higher frequency of measurements, and vice-versa.

Regardless of the precise mechanism by which the leak is detected, in most cases the general direction of the leak will be known based on the detection of the leak, or the direction of the leak could be solidified by further measurements (e.g., installing and/or activating additional ground-based measurement stations, expanding the sweep area of the InSAR-based measurements). In some cases, knowing the general direction of the leak may directly indicate the flow path for the leak, for example knowing the general leak direction in combination with existing seismic data may directly indicate the flow path as being along a known geological fault.

Figure 4:
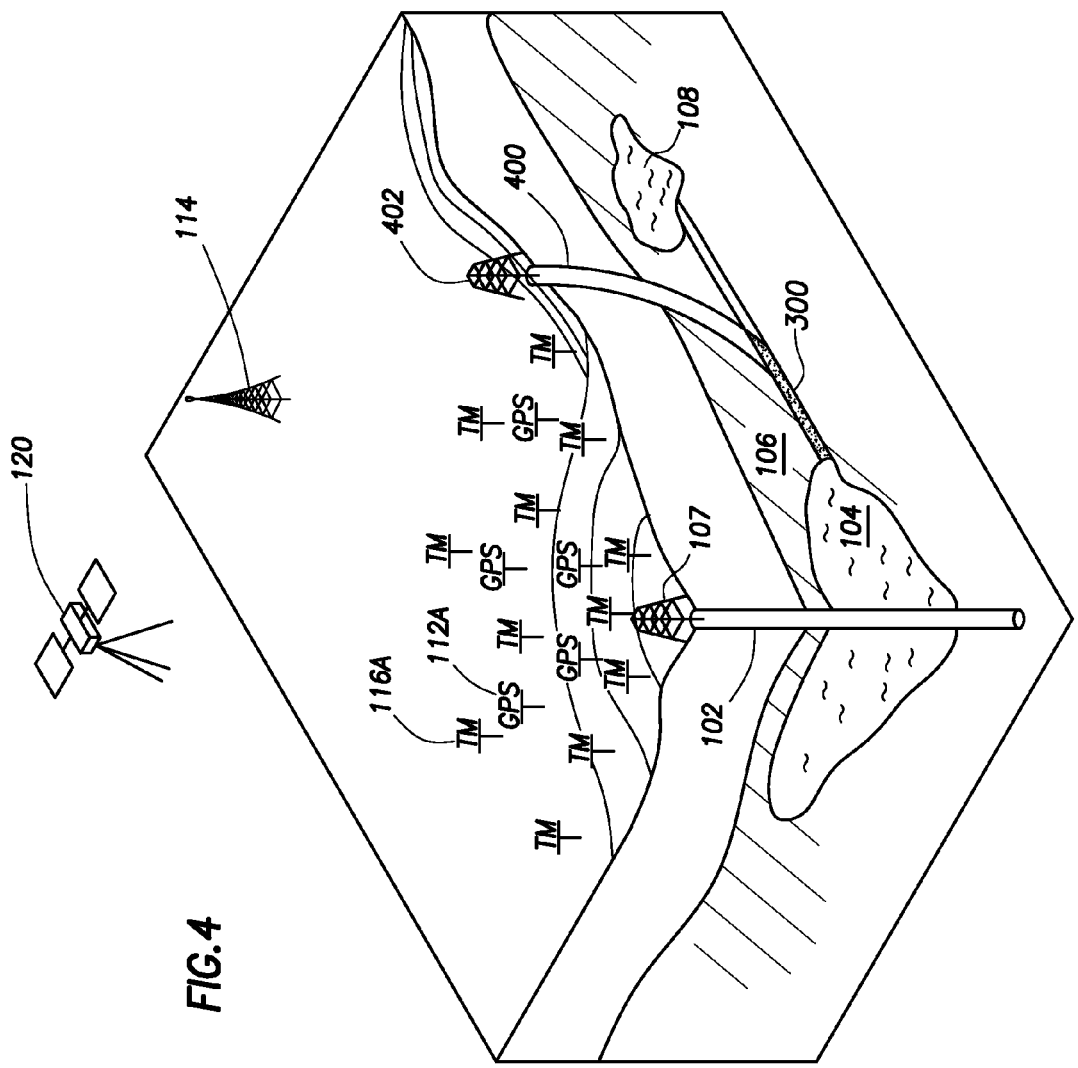
FIG. 4 shows a perspective cut-away view of a plurality of subterranean zones and related monitoring equipment after the flow path of the leak has been intercepted by a borehole, in accordance with at least some embodiments.

Once a leak has been detected and at least a general direction of the leak determined, in accordance with the various embodiments a second borehole is drilled to intersect the flow path 300 of the leak. FIG. 4 illustrative shows the second borehole 400 drilled from a derrick 402. However, the presence of derrick 402 in illustrative FIG. 4 should not imply that the drilling of the second borehole 400 must be drilled by conventional techniques. Any suitable drilling system and method may be used to create the second borehole 400, such as drilling based on coiled tubing using a downhole "tractor". Moreover, illustrative FIG. 4 shows the second borehole 400 to be completely distinct from borehole 102; however, in at least some embodiments the second borehole 400 may be a branch borehole of the borehole through which the sequestered fluid is injected into the subterranean zone 104. Further still, even in cases where the borehole 102 and second borehole 400 are distinct, illustrative FIG. 4 should not be read to require a completely dedicated borehole used to intersect the flow path 300 of the leak. The second borehole may be drilled new, or may be a branch borehole from any existing borehole in the vicinity, including other injection/producing boreholes, as well as monitor boreholes in the vicinity. Finally, in illustrative FIG. 4, the second borehole 400 turns toward subterranean zone 104 to intersect the flow path 300 of the leak, but such is not required. The second borehole 400 may equivalently turn toward the subterranean zone 108, or in some cases intersection the flow path 300 of the leak at or near right angles to the direction of fluid flow within the flow path 300.

Figure 5:
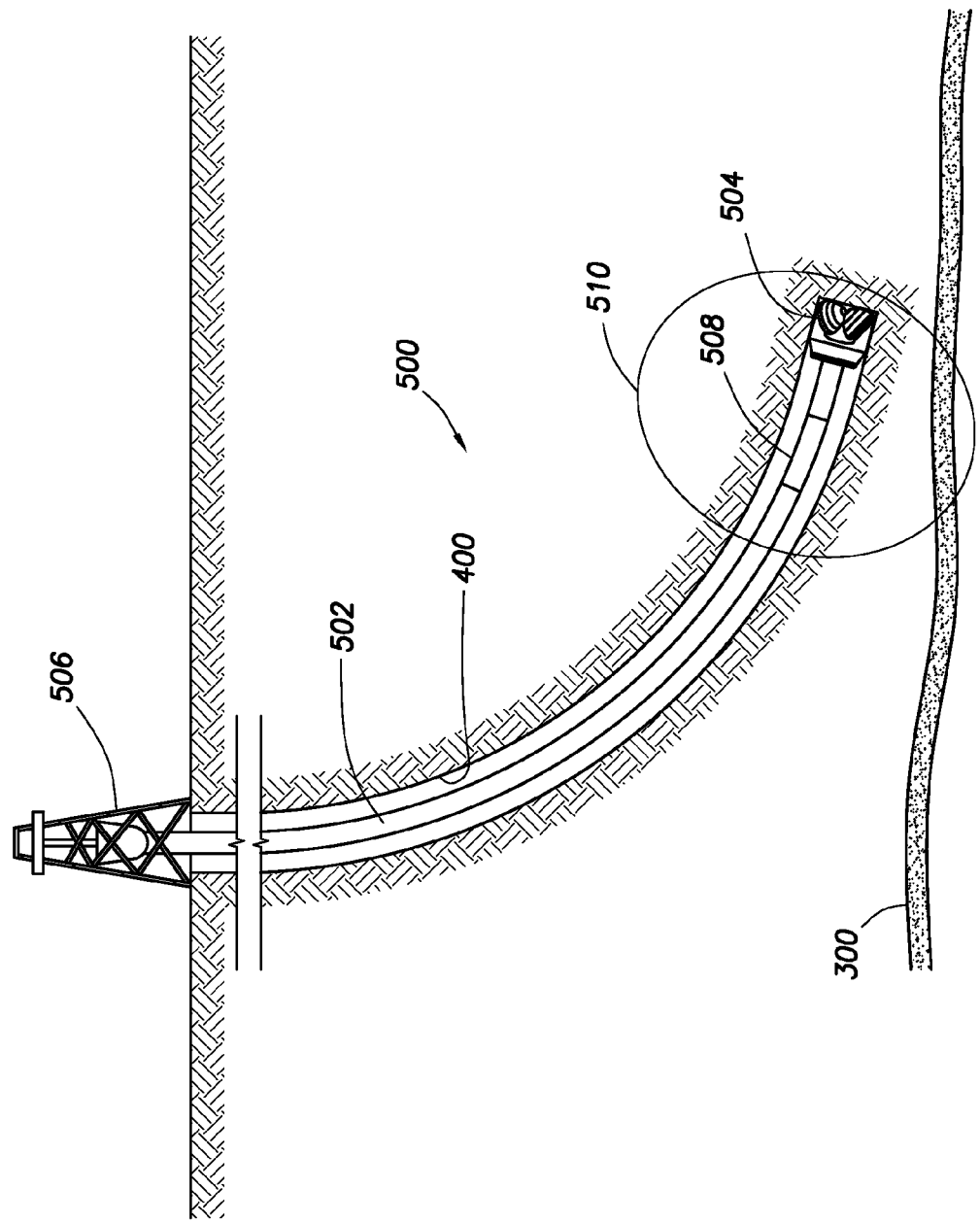
FIG. 5 shows a drilling system to intersect a flow path, in accordance with at least some embodiments.

In accordance with at least some embodiments, the location of the flow path 300 of the leak may be known in a general sense, but the precise location may not be known or determinable from the surface measurements and/or InSAR-based measurements made. In such cases, the drilling of the second borehole may begin initially in the direction indicated by the surface-based measurements and/or InSAR-based measurements, but refining the drilling direction to ensure intersection with the flow path 300 of the leak may be made by tools disposed within the second borehole 400. In particular, FIG. 5 shows a drilling system 500 that comprises drill string 502 having a drill bit 504 on a distal end thereof. Rotary motion of the drill bit 504, either caused by surface equipment 506 or by a downhole motor, creates the second borehole 400. In accordance with the illustrated embodiments, the drill string 502 comprises a downhole tool 508, the downhole tool in most cases relative close to the drill bit 504. The downhole tool 508 takes measurements with the drill string 502 within the second borehole 400, and in many cases the measurements may be made while drilling is taking place. Thus, downhole tool 508 may be referred to as a logging-while-drilling (LWD) or measuring-while-drilling (MWD) tool. Some in the industry assign distinctions between LWD and MWD, with LWD in most cases referring to measuring of properties of the formations surrounding the borehole, and MWD in most cases referring to measuring properties associated with the borehole itself or the drilling process (e.g., inclination of the borehole, downhole pressure of the drilling fluid, temperature). However, the terms are often used interchangeably, and for the balance of this discussion the term LWD will be used with the understanding that LWD also refers to MWD measurements.

In accordance with a particular embodiment, the drilling direction for the second borehole 400 is refined during drilling by use of LWD measurements of illustrative downhole tool 508. The type of downhole tool 508 used varies depending on the particular situation and the type of fluid moving along the flow path 300 of the leak. In most cases, however, the downhole tool 508 is used to detect contrast between properties of a rock formation in a volume 510 around the tool, where the contrast is with respect to properties of rock formations where the fluid is moving compared to rock formation free from the escaping fluid. There are a myriad of possible situations, and rather than attempt to define each possible situation, the specification gives a brief overview of several different types of downhole tools that may be used.

One type of downhole tool 508 that may be used falls in the class of tools known as "acoustic" tools. Acoustic tools emit an acoustic signal that propagates through the surrounding formation. In many cases the acoustic signal is in the high audible range and above. The acoustic tool also has one or more "listening" devices that detect portions of the acoustic signal as the signal propagates through the formation. Acoustic tools in many cases produce an indication of the speed of sound within the rock formations, and also in many cases the speed of sound measurement is azimuthally sensitive (i.e., directional in relation to the rotational orientation of the tool within the borehole). Thus, in combination with a tool that determines or measures the rotational orientation of the tool, an acoustic tool could identify the relative direction and/or proximity to the flow path 300 of the leak based on changes in speed of sound measured as a function of rotational orientation of the drill string. For example, as the drill bit approaches a rock boundary location where the lower rock formation contains the flow path 300 of the leak, the acoustic tool may identify the boundary based on sensed changes in speed of sound at particular rotational orientations of the tool.

Another illustrative type of downhole tool 508 that may be used falls within the class of tools termed induction or electromagnetic (EM) tools. EM tools launch or release electromagnetic waves that propagate through the formation. Portions of the electromagnetic waves are detected by sensors, and based on the amplitude or phase of the detected electromagnetic waves a variety of formation properties can be determined, such as resistivity (and inversely conductivity). In many cases the EM tools are azimuthally sensitive, and thus may detect approaching bed boundaries (such as an approaching flow path 300) based on the contrast in azimuthally sensitive conductivity readings above and below the tool.

Another illustrative type of downhole tool 508 that may be used falls within the class of tools termed conduction tools. Conduction tools create voltage potential that causes electrical current to flow from the tool, through the formation and back to the tool. Based on the electrical properties to induce a particular electrical current flow, attenuation of the current as the current flows through the formation, and phase shift of the current as the current flows through the formation, a variety of formation properties may be determined, such as resistivity (and inversely conductivity). In many cases the conduction tools are azimuthally sensitive, and thus may detect approaching bed boundaries (such as an approaching flow path 300) based on the contrast in azimuthally sensitive conductivity readings above and below the tool.

Two points are in order before proceeding. First, one of ordinary skill in the art is aware the various types of logging tools, and thus so as not to unduly complicate this description and to avoid obscuring the various embodiments, a more detailed discussion of logging tools is omitted. Secondly, while one of ordinary skill may be aware of such technologies, to the knowledge of the inventors herein, use of such technologies has not been with respect to intersecting a flow path 300 of a leak between subterranean zones, or intersecting with the ultimate goal of remediating the leak through the flow path. An illustrative set of logging tools that may be used comprises EWR®-PHASE 4 resistivity measurements, InSite ADR™ Azimuthal Deep Resistivity, InSite AFR™ Azimuthal Focused Resistivity, M5™ Integrated LWD, all available from Halliburton Energy Services, Inc., of Houston, Tex.

Moreover, while the specification highlights three broad categories of logging tools, many variations of the three broad categories are possible, and the high level descriptions should not be read as a limitation as to the configuration of tools that may be selected to help refine the drilling direction to ensure the second borehole 400 intersects the flow path 400. For example, some conduction tools may be self contained a short distance from the drill bit, while other conduction systems utilize the drill bit itself as the launch location for electrical current, thus focusing the conduction-based measurement more along the drilling direction. Moreover, the depth of measurement of each tool changes as a function of the tool type and particular tool configuration. Thus, in refining the drilling direction multiple tools may be used, first using a tool that interrogates a larger volume 510 of the formation surrounding the borehole 400 (but in most cases with lower spatial resolution for data obtained), then using a tool that interrogates a smaller volume 510 of the formation surrounding the borehole 400 (but with higher spatial resolution of the data), and so on. Further still, multiple tools, including tools of varying operational type, may be simultaneously used to help refine the drilling direction.

Figure 6:
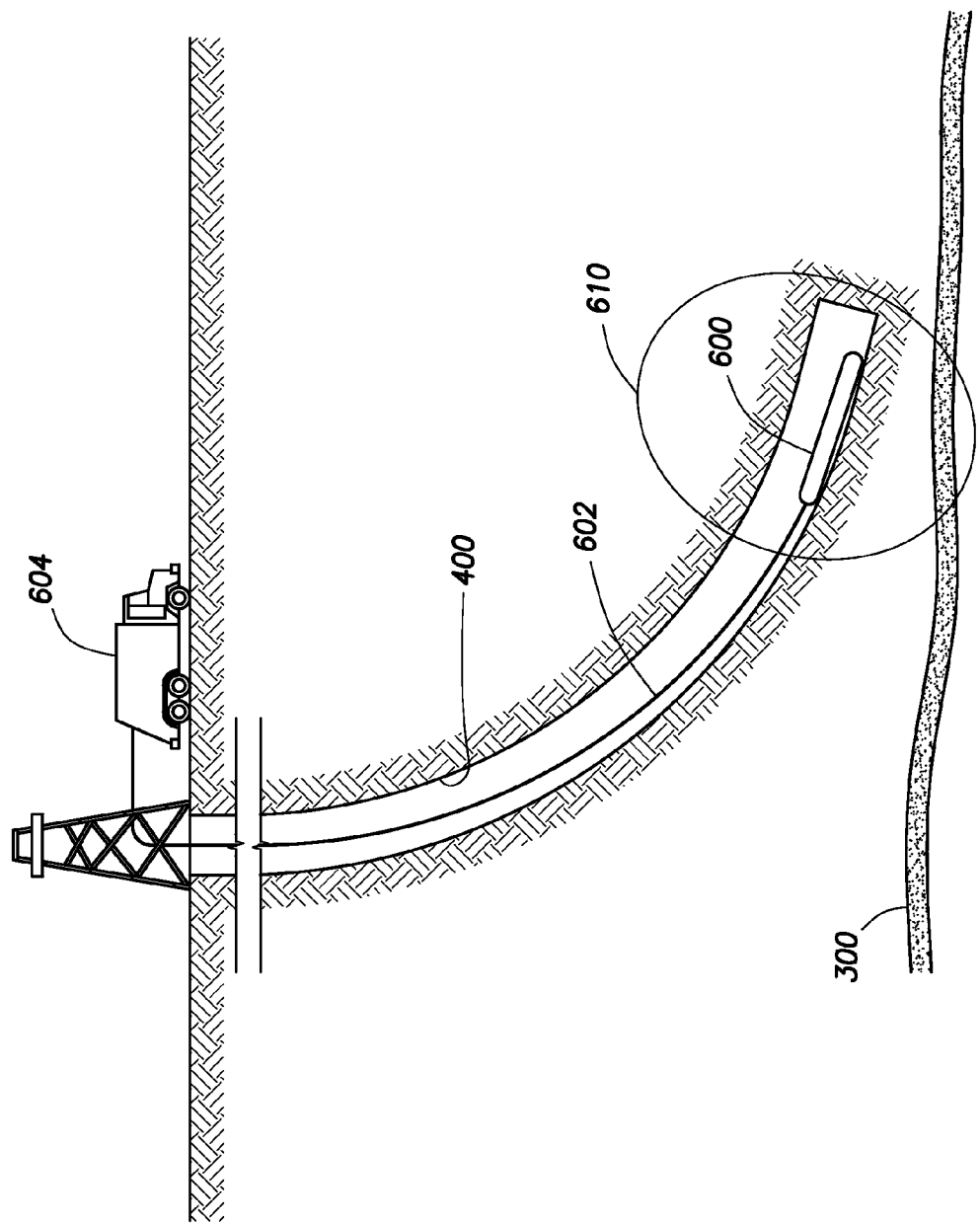
FIG. 6 shows a wireline logging system used to help intersect a flow path, in accordance with at least some embodiments.

The various embodiments to this point have described the refining of the drilling direction in a LWD sense; however, the refining of the drilling direction need not be limited to LWD tools. FIG. 6 shows other embodiments where the downhole tool used to refine the drilling direction is a wireline tool 600. In particular, in the situation illustrated by FIG. 6 the drill string has been removed or "tripped" from the borehole 400, and a tool 600 lowered into the borehole 400. The tool 600 comprises a pressure vessel within which various sensors and electronic devices are placed, and the tool is suspended within the borehole by a wireline or cable. Where the borehole 400 has a horizontal portion, it may be difficult to move the tool 600 into the horizontal portions; and thus, in some embodiments the tubing 602 (such as coiled tubing, or jointed pipe) is used. In particular, the wireline or cable is placed in operational relationship to the tubing (e.g., within the internal diameter), and thus force to move the tool 600 into horizontal portions may be supplied at the surface. In yet still other cases, the tool 600 may itself implement a physical system to move within the horizontal portions. Regardless of the mechanism to transfer the tool 600 within the horizontal portions, the cable communicatively couples the tool 600 to surface equipment 604. Like the LWD tools, the wireline tool 600 interrogates a volume 610 around the tool, and different tools may interrogate different volumes during the process of refining the drilling direction. The types of measurements that may be made with tool 600 are the same as those discussed with respect to the LWD tools discussed above.

While the various embodiments of refining drilling direction to intersect the flow path 300 of the leak have been in relation to LWD and wireline tools, the logging methods are not limited to LWD and wireline, as other logging techniques may be additionally or equivalently used. For example, in some embodiments may additionally use what is termed "mud logging" to help refine drilling direction. In one aspect of mud logging, the drilling fluid that returns to the surface is analyzed to determine the presence of components that entered the drilling fluid down hole. For example, if the fluid escaping along the flow path 300 is carbon dioxide, an increase in carbon dioxide in the drilling fluid that returns to surface would confirm that the second borehole 400 has intersected the flow path 300. Similar analysis may be performed for any fluid escaping along the flow path 300.

As yet another example, the cuttings that are carried to the surface in the drilling fluid can be analyzed to determine their mineralogical and/or elemental content. If the flow path 300 of the leak resides within a known type of rock (e.g., known based on previous seismic work in the area or survey wells), when analysis of the cuttings show an increase in the type of rock through which the flow path 300 is known to reside, such may indicate that the second borehole 400 has intersected the flow path 300. Use of logging devices and systems as described is merely illustrative, and one of ordinary skill, now understanding the goal of intersection for purposes of remediating a leak between subterranean zones, could select a suite of logging tools to refine the direction of the intersecting borehole based on the particular situation presented.

Returning to FIG. 4, once the second borehole 400 has intersected the flow path 300, in accordance with the various embodiments a sealing compound is placed in the flow path 300 through borehole 400 to reduce to flow of fluid along the flow path 300, and in some cases to seal escape of fluid along the flow path 300. More particularly, in accordance with at least some embodiments, a sealing compound initially in the form of a fluid is pumped through the borehole 400 and into the flow path 300. The sealing compound lodges within the flow path and thereby reduces or stops the flow. Additionally, the sealing compound of some embodiments changes chemically or physically in the presence of the fluid moving along the flow path 300, to further ensure the flow is reduced or eliminated. FIG. 4 illustrates the reduction in flow along the flow path 300 by contrast in fill color along the flow path 300 that occurs where the second borehole intersects the flow path. The specification now describes illustrative sealing compounds based on the type of fluid leaking along the flow path.

Consider first the situation where the fluid leaking along the flow path 300 is carbon dioxide. In some embodiments, the sealing compound placed in the flow path 300 may be polymer, suspended in water, where the polymer further polymerizes upon contact with carbon dioxide. Thus, while initially pumpable, when the polymer further polymerizes, the polymer coagulates into an un-pumpable mass that reduces or blocks the passage the carbon dioxide along the flow path. Stated otherwise, the polymer viscosifies into an impermeable mass.

Now consider a situation where the fluid escaping along the flow path 300 is water, such as brine water. In such an illustrative situation, the sealing compound placed in the flow path 300 may be micro-fine cement (e.g., no larger than 5 microns) suspended in a hydrocarbon. While suspended in the hydrocarbon, the micro-fine cement lodges in the cracks and fissures that define the flow path 300. However, when the brine water displaces the hydrocarbon that suspended the cement, the water and cement chemically react and the cement hardens.

Now consider a situation where the fluid escaping along the flow path 300 is hydrocarbon. In such an illustrative situation, the sealing compound placed in the flow path 300 through the borehole 400 may be an organophyllic clay suspended in a water-based fluid. While suspended in the water-based fluid, the clay lodges in the cracks and fissures that define the flow path 300. However, when the hydrocarbons displace the water that suspended the clay, the clay absorbs hydrocarbons and swells, thus further reducing the escape of hydrocarbons along the flow path 300.

More generally then, the sealing compound may comprise a particulate material such as cement, sand, silica flour, gilsonite, graphite; fibrous materials, flaky materials, granular materials or combinations thereof; polymeric materials, a water-soluble material such as a starch, a starch mixture, a pregelatinized starch, a chemically modified starch, a naturally occurring starch or combinations thereof; a hydrophobically modified polymer; or combinations thereof.

Two points are in order before proceeding. First, one of ordinary skill in the art is aware of various types sealing compounds, and thus so as not to unduly complicate this description and to avoid obscuring the various embodiments a more detailed discussion of each category of sealing compound is omitted. Secondly, while one of ordinary skill may be aware of such technologies, to the knowledge of the inventors herein, use of such technologies has been as a mechanism to prevent loss of drilling fluid into formations penetrated by a borehole, not with respect to reducing or stopping a leak along a flow path 300 between subterranean zones. In the context of preventing loss of drilling fluid into formations, some commercially available sealing compounds comprise FLEXPLUG® W (for formations containing water), FLEXPLUG® OBM (for formations containing hydrocarbons), and FLEXPLUG® R (for formations containing water and/or dry gas flows), all available from Halliburton Energy Services, Inc., of Houston, Tex.

Before more directly discussing a method in accordance with at least some embodiments, the discussion returns briefly to measurements of surface deformation. With respect to making measurements of surface deformation, the various embodiments discussed to this point have relied, at least in part, on surface-based devices such GPS-based elevation measurements, and inclinometer-based measurements. Moreover, the InSAR-based readings again produce an indication of changes in surface elevation. However, making a reading indicative of surface deformation in accordance with the various embodiments is not limited to just readings that are directly indicative of surface deformation.

Figure 7:
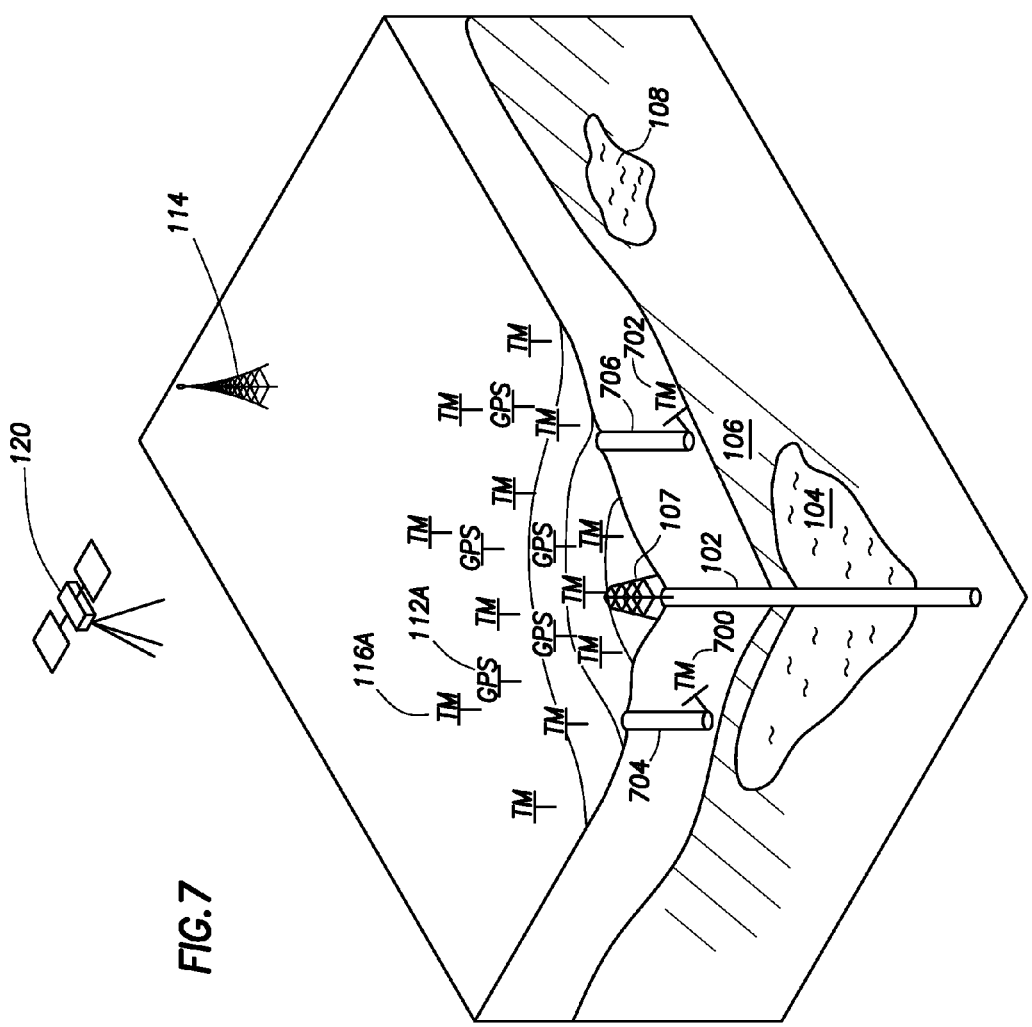
FIG. 7 shows a perspective cut-away view of a plurality of subterranean zones and related monitoring equipment, including at least some monitoring equipment within boreholes, in accordance with at least some embodiments.

In accordance with at least some embodiments, measurements may be taken in other locations, such as within boreholes proximate to the subterranean zone, but in some cases closer to the subterranean zone than the surface. In particular, FIG. 7 shows a system similar to that of FIG. 2, but where in addition to surface-based measurement devices 112 and 116, the system further includes a plurality of sub-surface measurement devices 700 and 702. More particularly still, in accordance with at least some embodiments, inclinometer-based measurement devices 700 and 702 may be placed in respective boreholes 704 and 706. Illustrative boreholes 704 and 706 may take many forms. In some cases the boreholes 704 and 706 are dedicated monitoring boreholes drilled specifically for monitoring the subterranean zone 104, such as for permanently or semi-permanently installed seismic sensors. In yet still other cases, the boreholes 704 and 706 may be active and/or abandoned hydrocarbon producing wells. Regardless of the precise nature of the boreholes 704 and 706, in some embodiments inclinometers are placed within the boreholes closer to the subterranean zone. In this way, the inclinometer-based measurements are more sensitive to the location of the injected fluid plume, and leaks, yet such measurements are still indicative of surface deformation. Deformation information for all the measurement devices may be combined when determining whether a leak from the subterranean zone 104 exists, and/or the direction of the leak.

The various embodiments to this point have been in reference to observing surface deformation of a non-submerged surface; however, the various embodiments are also applicable to subsea operations. In particular, using a combination of technologies, the "elevation" of the sea floor may be determined to millimeter scale accuracy. Since GPS will not operate under water, in some embodiments the determination is by way of GPS based location and elevation determinations of a vessel, and the vessel using underwater acoustic measurement techniques to determine the sea floor depth in relation to the surface. By combining the measurements, the elevation of the sea floor may be accurately determined. Using multiple measurements over time, one may obtain an interferometer-like determination of changes in sea floor elevation. An article by Spies et al. titled "Precise GPS/Acoustic positioning of seafloor reference points for tectonic studies", Physics of the Earth and Planetary Interiors, Volume 108, Number 2, published Jun. 30, 1998, discusses measurements of the sea floor elevation in the context of monitoring tectonic plate shifts.

In addition to the GPS/acoustics, for under water monitoring of underground formations regarding sequestration of fluids, one may permanently or semi-permanently install an array of inclinometer-based measurement device on or near the sea floor, and/or within monitor wells drill into the sea floor. Such inclinometer-based measurement devices may be connected to a monitoring control center via cables just like the non-submerged embodiments, or the inclinometer-based measurement devices may be configured with acoustic transceivers to transmit the incline measurements to a surface vessel or surface relay station. Other than difficulties associated with sub-surface monitoring, embodiments for monitoring the sea floor to determine location and movement of sequestered fluids are substantially the same as those discussed for non-submerged locations.

FIG. 8 illustrates a method in accordance with at least some embodiments. In particular, the method starts (block 800) and proceeds to: injecting a first fluid into a subterranean zone, the injecting by way of a first borehole (block 802); making a reading indicative of surface deformation (block 804); identifying, based on the surface deformation reading, a flow path for a second fluid out of the subterranean zone (block 806); drilling a second borehole that intersects the flow path (block 808); and placing a sealing compound into the flow path by way of the second borehole, the sealing compound reduces the flow of the second fluid through the flow path (block 810). Thereafter, the method ends (block 812).

FIG. 9 illustrates a refinement to the drilling step of the method of FIG. 8. That is, in accordance with at least some embodiments, the drilling step starts (block 900) and further comprises: drilling the second borehole initially in a direction indicated by the identifying of a flow path (block 902); and then refining drilling direction based on tools disposed within the second borehole (block 904); and thereby intersecting the flow path by the second borehole (block 906). Thereafter, the method ends (block 908).

The above discussion is meant to be illustrative of the principles and various embodiments of the present invention. Numerous variations and modifications will become apparent to those skilled in the art once the above disclosure is fully appreciated. For example, while discussed in terms of sequestration of carbon dioxide, the identification of leaks using surface deformation, drilling to intersect the leak, and sealing the leak may be used for any type of sequestration, as well for non-sequestration uses such as secondary recovery techniques that inject any suitable fluid, such as steam, carbon dioxide, water, nitrogen, natural gas, waste water and/or air. Further still, while the various embodiments rely on measures of surface deformation, such measures can be augmented by other data, such as real-time temperature and pressure data from wells instrumented with sensors connected to fiber optic cables. It is intended that the following claims be interpreted to embrace all such variations and modifications.

We claim:

1. A method comprising:
sequestering carbon dioxide in a subterranean zone by injecting the carbon dioxide into the subterranean zone by way of a first borehole; and then
making a reading indicative of surface deformation;
identifying, based on the surface deformation reading, a flow path for a second fluid out of the subterranean zone;
drilling a second borehole that intersects the flow path; and
placing a sealing compound into the flow path by way of the second borehole, the sealing compound reduces the flow of the second fluid through the flow path.

2. The method of claim 1 wherein drilling further comprises:
drilling the second borehole initially in a direction indicated by the identifying; and then
refining drilling direction based on tools disposed within the second borehole; and thereby
intersecting the flow path by the second borehole.

3. The method of claim 2 wherein refining further comprises refining by a diagnostic test in the form of a tool comprising at least one selected from the group consisting of: an acoustic logging tool; an electromagnetic logging tool; a conduction logging tool.

4. The method of claim 3 wherein measuring further comprises at least one selected from the group consisting of: measuring by way of a logging-while-drilling tool; measuring by way of a wireline logging tool conveyed into a borehole by gravity; and measuring by way of a wireline logging tool conveyed into a borehole by coiled tubing.

5. A method comprising:
injecting a first fluid into a subterranean zone, the injecting by way of a first borehole; and then
making a reading indicative of surface deformation;
identifying, based on the surface deformation reading, a flow path for a second fluid out of the subterranean zone;
drilling a second borehole that intersects the flow;

confirming intersection of the second borehole with the flow path by measuring constituents of drilling fluid returned to the surface during the drilling; and placing a sealing compound into the flow path by way of the second borehole, the sealing compound reduces the flow of the second fluid through the flow path.

6. The method of claim 1 wherein placing the sealing compound further comprises placing a compound that lodges within the flow path and thereby reduces flow of the second fluid.

7. The method of claim 6 wherein placing further comprises placing a compound that chemically reacts with the second fluid to viscosify into an impermeable mass.

8. The method of claim 6 wherein placing further comprises placing a compound that absorbs the second fluid and increases in volume.

9. The method of claim 1 wherein making a surface deformation reading further comprises making interferometric synthetic aperture radar measurements of surface elevation.

10. The method of claim 1 wherein making a surface deformation reading further comprises making global positioning system (GPS) based measurements.

11. The method of claim 10 wherein making GPS based measurements further comprises making a plurality of GPS based measurements at a plurality of locations at the surface.

12. The method of claim 1 wherein making a surface deformation reading further comprises taking readings from a plurality of inclinometers disposed at or near the surface.

13. The method of claim 1 wherein making a surface deformation reading further comprises taking readings from a plurality of inclinometers disposed within a plurality of monitoring boreholes proximate the subterranean zone.

14. The method of claim 1 wherein making a surface deformation reading further comprises combining the readings from two or more measurement types to determine the surface deformation, the two or more measurement types selected from the group consisting of: interferometric synthetic aperture radar measurements of surface elevation change; global positioning system (GPS) based measurements of elevation; and inclinometer-based measures of change in surface inclination.

15. The method of claim 5 wherein injecting the first fluid further comprises injecting the first fluid to increase hydrocarbon production from the subterranean zone.

16. The method of claim 5 wherein drilling further comprises:
   drilling the second borehole initially in a direction indicated by the identifying; and then
   refining drilling direction based on tools disposed within the second borehole; and thereby
   intersecting the flow path by the second borehole.

17. The method of claim 5 wherein placing the sealing compound further comprises placing a compound that lodges within the flow path and thereby reduces flow of the second fluid.

18. The method of claim 5 wherein making a surface deformation reading further comprises making interferometric synthetic aperture radar measurements of surface elevation.

19. The method of claim 5 wherein making a surface deformation reading further comprises making global positioning system (GPS) based measurements.

20. The method of claim 5 wherein making a surface deformation reading further comprises taking readings from a plurality of inclinometers disposed at or near the surface.

21. The method of claim 5 wherein making a surface deformation reading further comprises taking readings from a plurality of inclinometers disposed within a plurality of monitoring boreholes proximate the subterranean zone.

22. The method of claim 5 wherein making a surface deformation reading further comprises combining the readings from two or more measurement types to determine the surface deformation, the two or more measurement types selected from the group consisting of: interferometric synthetic aperture radar measurements of surface elevation change; global positioning system (GPS) based measurements of elevation; and inclinometer-based measures of change in surface inclination.

* * * * *